US009325170B2

(12) United States Patent
Rozman et al.

(10) Patent No.: US 9,325,170 B2
(45) Date of Patent: *Apr. 26, 2016

(54) MATRIX-BASED POWER DISTRIBUTION ARCHITECTURE

(71) Applicant: HAMILTON SUNDSTRAND CORPORATION, Windsor Locks, CT (US)

(72) Inventors: Gregory I. Rozman, Rockford, IL (US); Steven J. Moss, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 560 days.

This patent is subject to a terminal disclaimer.

(21) Appl. No.: 13/757,237

(22) Filed: Feb. 1, 2013

(65) Prior Publication Data

US 2014/0217821 A1    Aug. 7, 2014

(51) Int. Cl.
| | |
|---|---|
| H02J 1/00 | (2006.01) |
| H02J 3/00 | (2006.01) |
| H02J 1/14 | (2006.01) |
| B60L 1/00 | (2006.01) |
| B60L 11/18 | (2006.01) |
| H02J 1/10 | (2006.01) |

(52) U.S. Cl.
CPC ... *H02J 1/14* (2013.01); *B60L 1/00* (2013.01); *B60L 11/1864* (2013.01); *H02J 1/102* (2013.01); *H02J 2001/008* (2013.01); *H02J 2001/106* (2013.01); *Y10T 307/391* (2015.04)

(58) Field of Classification Search
CPC ............. H02J 1/00; H02J 1/10; H02J 1/14; H02J 3/005; H02J 2001/008; H02J 2001/106; H02J 307/391

USPC ........................................ 307/29, 11, 18, 140
See application file for complete search history.

(56) References Cited

U.S. PATENT DOCUMENTS

| | | | |
|---|---|---|---|
| 4,618,779 | A | 10/1986 | Wiscombe |
| 5,654,859 | A | 8/1997 | Shi |
| 6,586,850 | B1 | 7/2003 | Powers |
| 7,007,179 | B2 | 2/2006 | Mares et al. |
| 7,564,147 | B2 | 7/2009 | Michalko |
| 8,390,151 | B2 | 3/2013 | Rozman et al. |

(Continued)

FOREIGN PATENT DOCUMENTS

| | | |
|---|---|---|
| EP | 2632048 A1 | 8/2013 |
| EP | 2757647 A2 | 7/2014 |
| WO | 2009153657 A1 | 12/2009 |

OTHER PUBLICATIONS

Extended European Search Report in corresponding EP Application No. 141535278, mailed Oct. 13, 2014.

(Continued)

*Primary Examiner* — Thienvu Tran
*Assistant Examiner* — Toan Vu
(74) *Attorney, Agent, or Firm* — Cantor Colburn LLP

(57) ABSTRACT

A power management and distribution (PMAD) system includes first and second power supplies, first and second loads and a matrix of solid state power controllers (SSPCs) connected between the first and second power supplies and the first and second loads. The matrix is configured to selectively supply each of the first and second loads with a plurality of different power levels based on on/off states of the SSPCs of the matrix.

14 Claims, 5 Drawing Sheets

(56) References Cited

U.S. PATENT DOCUMENTS

| | | |
|---|---|---|
| 8,519,686 B2 | 8/2013 | Rozman et al. |
| 8,536,730 B2 | 9/2013 | Rozman et al. |
| 8,553,373 B2 | 10/2013 | Rozman et al. |
| 8,625,243 B2 | 1/2014 | Rozman et al. |
| 2007/0273216 A1* | 11/2007 | Farbarik .................. 307/86 |
| 2008/0031020 A1* | 2/2008 | Lee .......................... 363/40 |
| 2011/0276190 A1 | 11/2011 | Lillis et al. |
| 2012/0206844 A1* | 8/2012 | Tofigh et al. ............ 361/42 |
| 2013/0069592 A1* | 3/2013 | Bouman ................. 320/109 |
| 2013/0278193 A1 | 10/2013 | Rozman et al. |

OTHER PUBLICATIONS

European Search Report for Application No. 14153527.8-1806 Mailed June 4, 2014. 5 pages.

* cited by examiner

MATRIX-BASED POWER DISTRIBUTION ARCHITECTURE

BACKGROUND OF THE INVENTION

Embodiments of the invention relate to a power distribution architecture, and more particularly to a matrix-based DC power management and distribution architecture to distribute power to various vehicle systems.

A solid state power controller (SSPC) is used in power management and distribution systems to replace traditional electromechanical circuit breakers. Its main functions are to distribute power and protect various electrical loads. In comparison to electromechanical devices, SSPCs provide a relatively fast response time, and may eliminate arcing during turn-off transient and bouncing during turn-on transient. SSPCs facilitate advanced protection and diagnostics, allowing for efficient power management and distribution architectures. SSPCs include power semiconductor devices that control power (voltage and/or current) supplied to a load. SSPCs perform supervisory and diagnostic functions in order to identify and prevent overload and short circuit conditions. Components of SSPCs may include power semiconductor switching devices, sensors to monitor output voltage and current and power semiconductor device temperature, and control circuitry. The control circuitry may include a microcontroller consisting of an arithmetic logic unit (ALU), memory, timer/counters, serial port, input/output (I/O) ports, and clock oscillator. Some SSPCs are programmable by a computer, user or by any proprietary method.

In the case of a faulty SSPC or power supply, power is interrupted to the load leading to interruption of one or more load functions.

BRIEF DESCRIPTION OF THE INVENTION

Embodiments of the present invention include a power management and distribution (PMAD) system that includes first and second power supplies, first and second loads and a matrix of solid state power controllers (SSPCs) connected between the first and second power supplies and the first and second loads. The matrix is configured to selectively supply each of the first and second loads with a plurality of different power levels based on on/off states of the SSPCs of the matrix.

Embodiments of the invention further include a power management and distribution (PMAD) controller of a matrix-based PMAD system. The PMAD controller includes a summing amplifier configured to receive as inputs first and second sensed current signals from first and second solid state power controllers (SSPCs) of an SSPD matrix between a plurality of power supplies and a plurality of loads. The PMAD controller also includes a reference voltage modification circuit configured to receive as an input a summed sensed current signal from the summing amplifier and to output to first and second power supplies of the plurality of power supplies first and second reference voltage modification signals to modify a voltage output from the first and second power supplies.

Embodiments of the invention further include a method of controlling a matrix-based power management and distribution (PMAD) system. The method includes determining a number of loads among a plurality of loads to receive power and determining a level of power to be received by the loads determined to receive the power. The method further includes controlling a matrix of solid-state power controllers (SSPCs) connected between a plurality of power supplies and the plurality of loads to deliver the determined level of power to the loads determined to receive the power.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Power management and distribution systems including a plurality of power supplies, loads, and solid state power controllers are subject to failures. Required fault tolerance for critical loads may result in additional redundant power supplies, power busses and SSPCs to supply power to the critical loads. In addition, to accommodate variable load demands, for example during overload condition, the SSPCs and power supplies are selected to be relatively large to be able to accommodate large levels of power. Embodiments of the invention relate to a matrix-based power management and distribution architecture that may address one or more of these or other problems.

Figure 1:
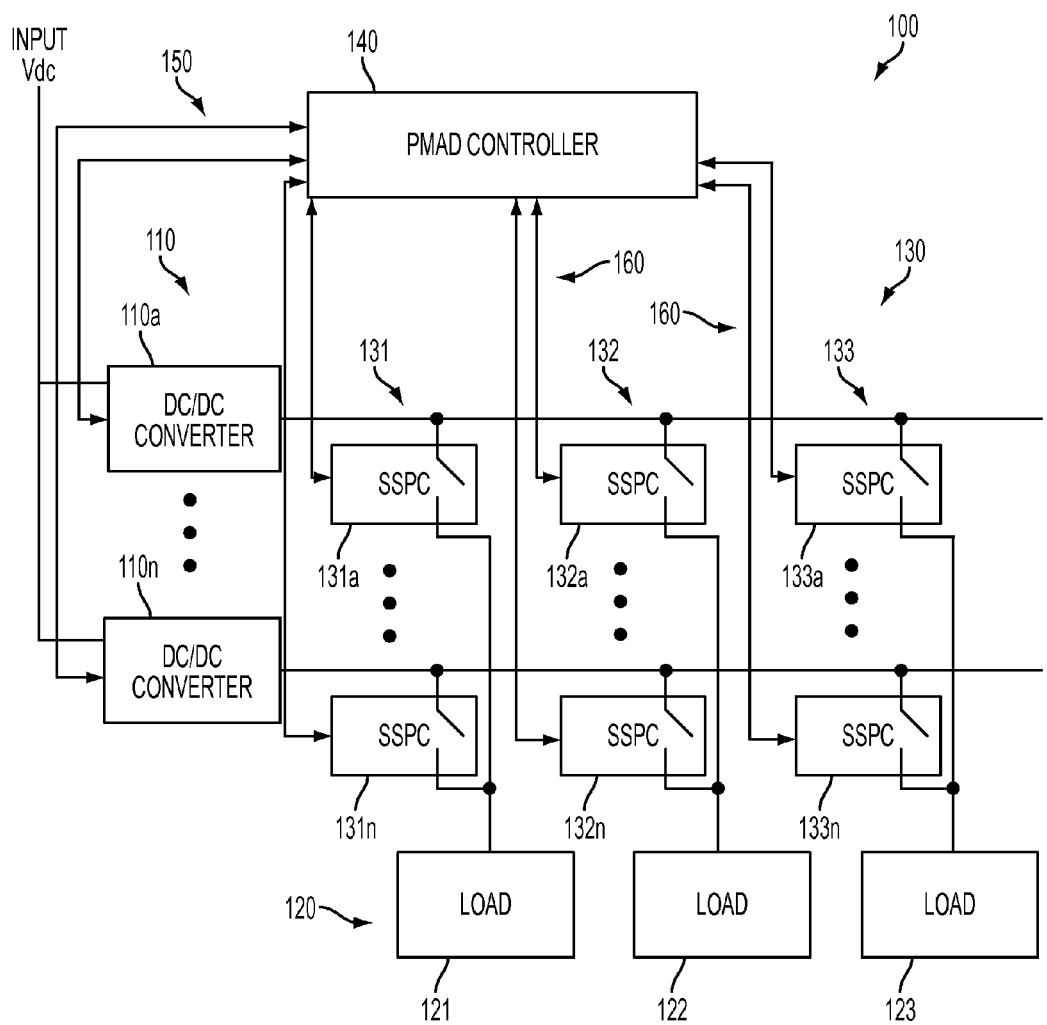
FIG. 1 illustrates a diagram of a matrix-based power management and distribution architecture according to one embodiment of the invention.

FIG. 1 illustrates a matrix-based power management and distribution system 100 according to an embodiment of the invention. The system 100 includes a plurality of dc-dc converters (power supplies) 110, that are powered by the input dc power bus ($V_{dc}$), loads 120 that receive power from the power supplies 110 via a matrix 130 of solid state power controllers (SSPC) that are controlled to form paths for power between the power supplies 110 and the loads 120. A power management and distribution (PMAD) controller 140 controls the SSPCs of the matrix 130 to generate the current paths between the power supplies 110 and the loads 120.

The system 100 includes power supply communication signals 150 between the PMAD controller 140 and the power supplies 110 by which the PMAD controller 140 receives information regarding the status of the power supplies 110 and the PMAD controller 140 controls the power output by the power supplies 110 based on the availability of power sources and load demands. The system 110 further includes SSPC matrix communication signals 160 by which the SSPCs of the SSPC matrix 130 communicate information to the PMAD controller 140 regarding power output to the loads 120 and the PMAD controller 140 controls the on/off states of switches in the SSPCs of the SSPC matrix 130.

FIG. 1 illustrates power supplies $110a$ to $110n$, where the power supply $110a$ represents a first power supply and the power supply $110n$ represents a last power supply among a plurality of power supplies. In other words, while two power supplies 110a and 110n are illustrated for purposes of description, any number of power supplies 110 may exist in the system 100, such as three, four, ten, etc. Each power supply receives as an input power from dc bus $V_{dc}$ and outputs a reduced or increased power level to the SSPC matrix 130. In some embodiments, each power supply 110a to 110n is configured to output substantially the same power level to the SSPC matrix 130. However, in embodiments of the invention, the power outputs of each power supply 110a to 110n may be adjusted based on power characteristics detected in the power supplies 110a to 110n and in the SSPCs of the SSPC matrix 130. In embodiments of the invention, the power supplies 110 may be DC to DC converters configured to convert an input DC voltage, Input $V_{dc}$, to a lower or higher output DC voltage. However, embodiments of the invention encompass any type of power supply.

FIG. 1 further illustrates three loads 121, 122 and 123. However, any number of loads may exist in the system 100. The loads 121, 122 and 123 may correspond to electronic circuitry that require power, other electrical or electromechanical devices, batteries that may be charged, or any other devices capable of consuming power. In addition, FIG. 1 illustrates first, second and third SSPC stages 131, 132 and 133, each made up of a plurality of SSPCs 131a to 131n, 132a to 132n and 133a to 133n. However, embodiments of the invention encompass any number of SSPC stages and any number of SSPCs per stage. For purposes of description, an SSPC stage corresponds to a series of SSPCs having power outputs connected to a same load 120 and each SSPC in each stage has a power input connected to a separate power supply 110.

In embodiments of the invention, the PMAD controller 140 is configured to determine a number of loads 120 that are to receive power. The number of loads 120 to receive power may be provided by a user, by a computer program, by a device or system connected to the PMAD controller 140 or by any other method. The PMAD controller 140 further determines a power level to be supplied to each load 120 that is to receive power.

Based on the determinations of which loads 120 are to receive power, and the power levels to be delivered to each load, the PMAD controller 140 controls the SSPCs of the SSPC matrix 130 to deliver the desired power to the loads 120. For example, if it is determined that only load 122 is to receive power and that the level of power corresponds to the output from two power supplies 110, then the PMAD controller 140 may control the SSPCs 132a and 132n to turn on to supply power from the power supplies 110a and 110n to the load 122 and to utilize load sharing control, as discussed below. On the other hand, if it is determined that each of loads 121, 122 and 123 is to receive power, and that load 121 is to receive power corresponding to the output from one power supply 110 and loads 123 are to receive power corresponding to half of the output from a power supply 110, then the PMAD controller 140 may turn on SSPC 131n to supply power from power supply 110n to the load 121, and the PMAD controller 140 may turn on SSPCs 132a and 133a to divide the current output from the power supply 110a between the loads 122 and 123.

In addition, during single load overload condition, the system may be re-configured to disconnect power from non-critical load and provide additional power to the load that experiences overload. A load sharing control is activated during this event to ensure equal load sharing between the power sources. After the overload condition clears, the system is re-configured back to the default condition that existed prior to the overload condition.

Figure 2:
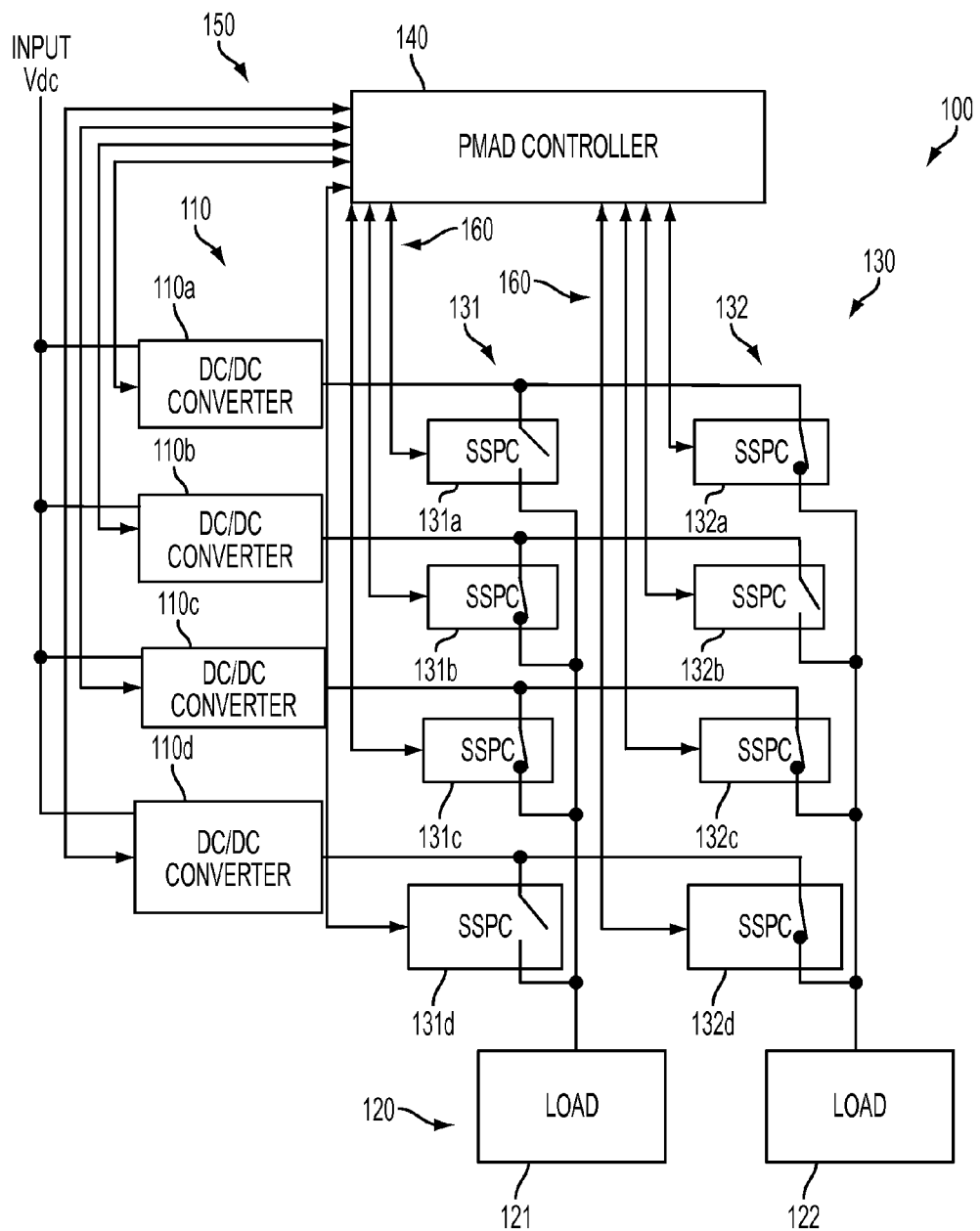
FIG. 2 illustrates a diagram power-supplying state of a matrix-based power management and distribution architecture according to an embodiment of the invention.

In addition, embodiments of the present invention encompass bi-directional SSPCs that allow current to flow from an input-to-output direction or from an output-to-input direction according to a desired power output level. The bi-directional SSPC may also include a bi-directional current interruption. In the present specification, the term "power input" as it relates to the SSPCs of the SSPC matrix 130 refers to the end of the SSPCs connected to the power line output from the power supplies 110. Conversely, the term "power output" as it relates to the SSPCs of the SSPC matrix 130 refers to the end of the SSPCs connected to the line input to the loads 120. However, as discussed above, in embodiments of the invention, current may be controlled to flow bi-directionally through the SSPCs. FIG. 2 illustrates an example of bi-directional current flow to supply power to a load 120 when a faulty SSPC is detected.

Referring to FIG. 2, four power supplies 110a, 110b, 110c and 110d are provided. In addition, the first stage of SSPCs 131 includes SSPCs 131a to 131d and the second stage of SSPCs 132 includes SSPCs 132a to 132d. The PMAD controller 140 may determine that the load 122 is to receive power output from all four power supplies 110a to 110d. However, SSPC 132b may be a faulty SSPC that does not permit current to flow through the SSPC 132b. Accordingly, the PMAD controller 140 may control SSPCs 132a, 132c, 132d, 131c and 131a to turn on, or to close switches in the SSPCs 132a, 132c, 132d, 131c and 131a, to permit power to be supplied from the power supplies 110a to 110d to the load 122. In particular, in the configuration illustrated in FIG. 2, current flows from the power supply 110a through SSPC 132a to the load 122. In addition, current flows from the power supply 110b, through the SSPC 131b, through the SSPC 131c (in an output-to-input direction), through the SSPC 132c to the load 122. Similarly, the current flows from the power supply 110c through the SSPC 132c to the load 122. Finally, current flows from the power supply 110d through the SSPC 132d to the load 122. Accordingly, in embodiments of the present invention, the SSPC matrix 130 permits power to be supplied to a load 120 even when a fault occurs in one or more SSPC devices.

Figure 3:
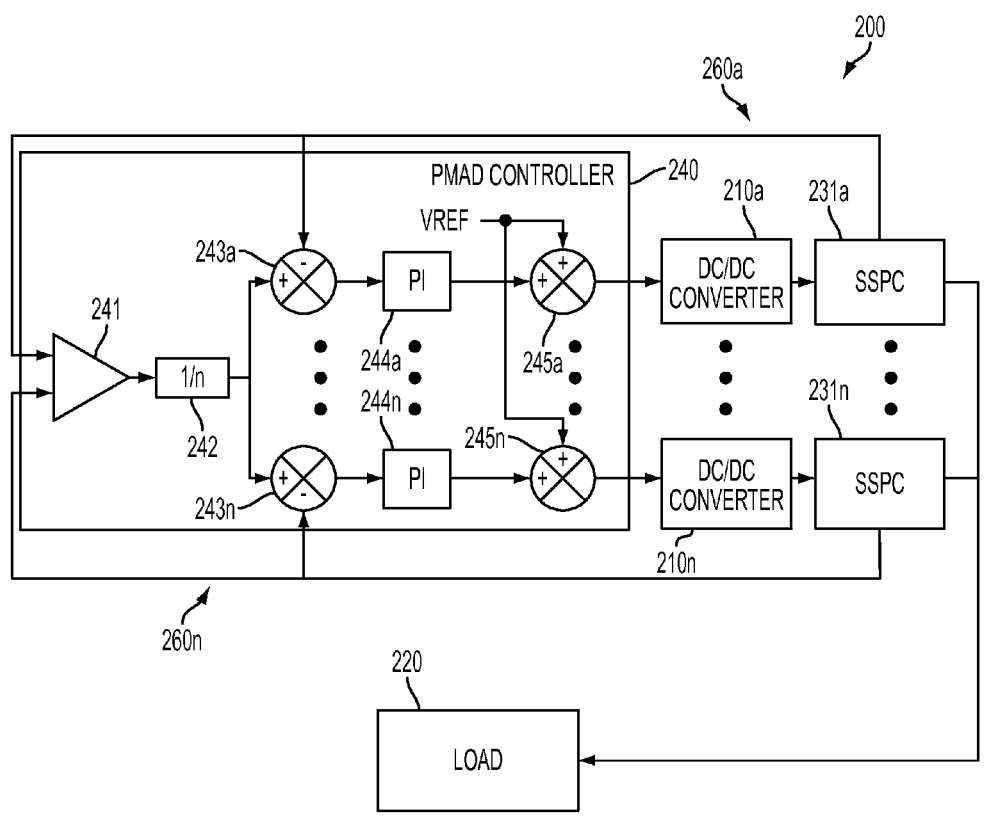
FIG. 3 is a block diagram of a load sharing architecture according to one embodiment of the invention.

FIG. 3 illustrates a load sharing architecture 200 according to an embodiment of the invention. The load sharing architecture 200 is embodied in one or more semiconductor circuits and may include one or more processors, arithmetic logic units, registers, memory, filter circuitry, etc. The architecture 200 may include or comprise software executed by a processor to receive signals as inputs, analyze combine the signals, and output adjusted signals to control devices such as power supplies and SSPCs. The architecture 200 includes a PMAD controller 240, power supplies 210a to 210n, and solid state power controllers (SSPCs) 231a to 231n connected to a load 220. The PMAD controller 240 corresponds to the PMAD controller 140 of FIG. 1, the power supplies 210a to 210n correspond to the power supplies 110 of FIG. 1, the SSPCs 231a to 231n correspond to the SSPC matrix 130 of FIG. 1, and the load 220 corresponds to the loads 120 of FIG. 1. While only one stage of SSPCs 231a to 231n is illustrated in FIG. 3, it is understood that embodiments of the invention encompass a matrix of SSPCs including multiple stages, each stage comprising multiple SSPCs connected to different power supplies and a same load. In addition, while only one load 220 is illustrated in FIG. 3, it is understood that embodiments of the invention encompass any number of loads 220. In this case, however, the output current signals from SSPCs associated with the same power source may be summed together prior to summing them in the summing amplifier 241, described below.

The PMAD controller 240 includes a summing amplifier 241 configured to receive as inputs sensor signals 260a to 260n corresponding to power output from the SSPCs 231a to 231n. In one embodiment, the sensor signals are current sensor signals detecting current output from each SSPC 231a to 231n. A divider 242 divides the summed sensor signal output from the summing amplifier 241 by a number of power sources "n" to produce an average current signal.

Current feedback signal comparators 243a to 243n receive respective SSPCs 231a to 231n output current feedback signals as well as average current signal at the output of block 242 and compare their difference to produce current difference signals. The current difference signals are processed by proportional—integral (PI) blocks 244a to 244n to produce voltage bias signals. Alternatively, a PI block may be substituted by a lag function. Voltage bias signals are input to summing circuits 245a to 245a, where they are summed with a predetermined reference voltage $V_{REF}$. The result is an adjusted voltage reference signal that is output to the power supplies 210a to 210n. In other words, during operation, the reference voltage $V_{REF}$ controls a power output of the power supplies 210a to 210n. The PMAD controller 240 adjusts the power output from the power supplies 210a to 210n by adjusting the voltage reference signal based on current output levels detected by the SSPCs 231a to 231n to achieve load sharing between power supplies 210a to 210n.

Figure 4:
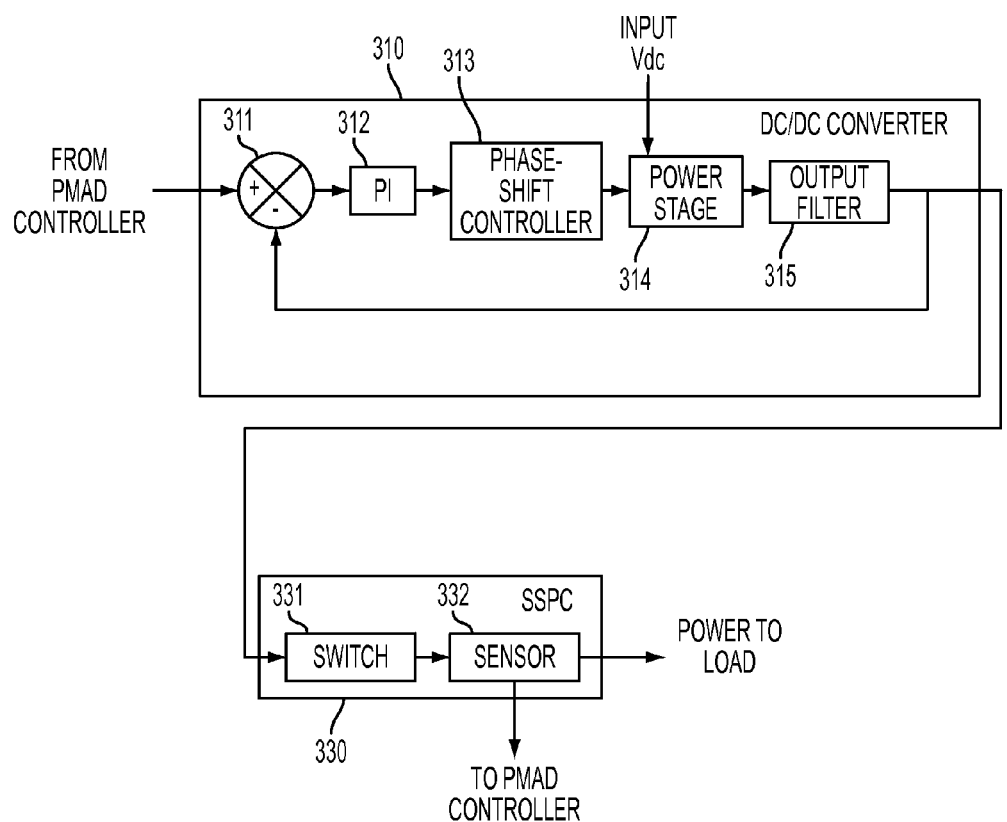
FIG. 4 is a block diagram of a power supply and solid state power controller according to one embodiment of the invention.

FIG. 4 illustrates a power supply 310 and SSPC 330 according to an embodiment of the invention. The power supply 310 and SSPC 330 may correspond to the power supplies 110 and 210 of FIGS. 1 and 3, and the SSPC 330 may correspond to the SSPCs of the SSPC matrix 330 and the SSPCs 230a to 230n of FIG. 3. The power supply 310, which may be a DC to DC converter, receives as an input the adjusted reference voltage signal from the PMAD controller 240 and compares it in a voltage feedback signal comparator 311 with a feedback signal of the power output from the power supply 310.

The power supply 310 may further include a PI circuit 312 and a phase shift controller 313. Although a phase shift controller 313 is provided in FIG. 4 as an example of a DC to DC converter, embodiments of the present invention encompass any power converter according to the design considerations of the power distribution system. A power stage 314 receives as an input a voltage $V_{dc}$. The voltage $V_{dc}$ may be a high voltage level supplied to each power supply 310, and the high voltage level may be converted to a low voltage level based on the output signal from the phase shift controller 313 (or other DC to DC converter). The voltage $V_{dc}$ may also be a low voltage level supplied to each power supply 310 and the low voltage level may be converted to a high voltage level based on the output signal from the phase shift controller 313 (or other DC to DC converter). The resulting power signal is output through an output filter 315 to the SSPC 330.

The SSPC 330 includes a switch 331, such as a power semiconductor switch including one or more transistors, and a sensor 332 to sense current output levels of the SSPC 330. The SSPC 330 outputs power to a load and outputs sensor signals to the PMAD controller, which controls SSPC 330 devices to route around faulty circuitry and controls power supplies 310 to adjust power output levels based on sensed power characteristics of the SSPC 330.

Figure 5:
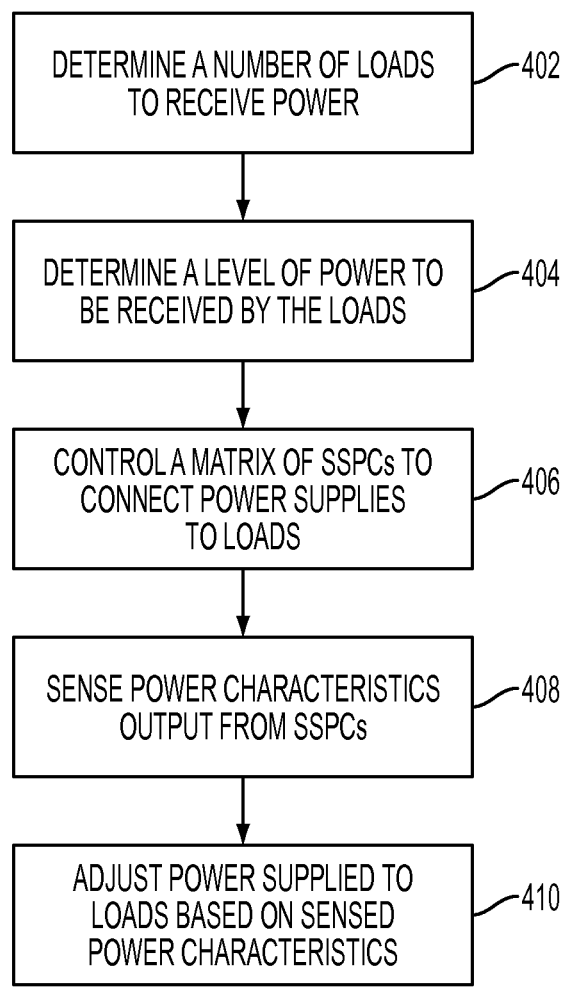
FIG. 5 is a flowchart of a method for controlling a matrix-based power management and distribution system according to an embodiment of the invention.

FIG. 5 illustrates a method of controlling a matrix-based power management and distribution (PMAD) system according to embodiments of the present invention. In block 402, a number of loads in the PMAD system that are to receive power is determined. The number of loads to receive power may be determined by a user, by a control system or program, or by any other method. In block 404, the level of power to be supplied to each of the loads is determined based on load demand and the availability of power supplies. For example, it may be determined whether one load is to receive power corresponding to one power supply or two or more power supplies, whether multiple loads are to receive power corresponding to one or more power supplies, or any other variation of multiple power supplies supplying power to multiple loads.

In block 406, a solid-state power controller (SSPC) matrix is controlled to connect the determined loads with the determined number of power supplies to supply the loads with the correct power levels. The matrix comprises multiple stages of SSPCs, where each stage includes multiple SSPCs, each having a power input connected to a separate power supply and a power output connected to the same load. The SSPCs may be bi-directional SSPCs to permit current flow from an output-to-input direction to route power around failed circuitry, such as failed SSPCs.

In block 408, power characteristics, such as current, output from the SSPCs is detected. The power characteristics may be supplied to a PMAD controller, which may control the power supplies and the SSPCs based on the detected power characteristics in block 410. As discussed above, a PMAD controller may adjust a reference voltage to power supplies based on the sensed power characteristics to adjust the power output from the power supplies to achieve load sharing between the power supplies.

In embodiments of the present invention, a matrix of solid-state power controllers (SSPCs) is used to dynamically supply a plurality of loads with power form a plurality of power supplies. The loads that receive power, and the amount of power received at each load, is adjusted by turning on and off SSPCs of the matrix and controlling power supplies output. Accordingly, one load may receive power from one power supply or from multiple power supplies. In addition, multiple loads may receive power from one power supply or from multiple power supplies. By controlling the SSPCs that are turned on and off, a power management and distribution (PMAD) controller can isolate faulty power supplies and faulty loads, while continuing to provide power to functional power supplies and loads. In addition, by controlling the SSPCs that are turned on and off, the PMAD controller can re-route power around faulty SSPCs to provide power to loads even when one or more SSPCs in the matrix is turned off, incapable of reliably providing power, or otherwise faulty.

In embodiments of the invention, the PMAD controller may include software and hardware to detect faults in a power supply, in SSPCs and in loads. For example, the PMAD controller may detect a faulty power supply or faulty load by detecting power characteristic levels outside predetermined thresholds via sensor signals from the power supply or from SSPCs electrically connected to the power supply or load. Likewise, the PMAD controller may detect faults in SSPCs based on power characteristic levels from power sensors in the SSPCs that are outside predetermined thresholds.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A power management and distribution (PMAD) system, comprising:
    first and second power supplies;
    first and second loads;
    a matrix of solid state power controllers (SSPCs) connected between the first and second power supplies and the first and second loads, the matrix configured to selectively supply each of the first and second loads with a plurality of different power levels based on on/off states of the SSPCs of the matrix; and
    a PMAD controller configured to control each of the SSPCs of the matrix to selectively output a predetermined voltage to each of the first and second loads, wherein each of the SSPCs of the matrix includes a current sensor configured to output a sensed current to the PMAD controller, the PMAD controller is configured to adjust a power output from the first and second power supplies based on the sensed current received from the SSPCs of the matrix, wherein the PMAD controller is configured to sum the sensed current from all of the SSPCs of the matrix to generate a summed sensed current, divide the summed sensed current by a number of power sources predetermined to deliver power to generate a reference voltage modification signal, and to adjust a reference voltage supplied to the first and second power supplies based on the reference voltage modification signal.

2. The PMAD system of claim 1, wherein the matrix comprises:
    first and second stages of solid state power controllers (SSPCs), the first stage of SSPCs including a first SSPC having a power input connected to the first power supply and a power output connected to the first load and a second SSPC having a power input connected to the second power supply and a power output connected to the first load, and the second stage of SSPCs including a third SSPC having a power input connected to the first power supply and a power output connected to the second load and a fourth SSPC having a power input connected to the second power supply and a power output connected to the second load.

3. The PMAD system of claim 2, further comprising:
    a third power supply;
    a third load; and
    a third stage of SSPCs, the third stage of SSPCs including a fifth SSPC having a power input connected to the first power supply and a power output connected to the third load, a sixth SSPC having a power input connected to the second power supply and a power output connected to the third load, and a seventh SSPC having a power input connected to the third power supply and a power output connected to the third load,
    wherein the first stage of SSPCs includes an eighth SSPC having a power input connected to the third power supply and a power output connected to the first load, and
    the second stage of SSPCs includes a ninth SSPC having a power input connected to the third power supply and a power output connected to the second load.

4. The PMAD system of claim 1, wherein the first and second power supplies are DC-DC converters configured to each receive as a power input a first DC voltage and to each output substantially a second DC voltage different from the first DC voltage.

5. The PMAD system of claim 1, wherein the PMAD controller is configured to determine a number of loads to receive power and a level of power to be received by the loads determined to receive the power and to control each of the SSPCs of the matrix to deliver the determined level of power to the loads determined to receive the power.

6. The PMAD system of claim 1, wherein the PMAD controller is configured to detect at least one of a faulty power supply and a faulty load and to control the SSPCs of the matrix to prevent the supply of power to the faulty load or isolate a faulty power supply.

7. The PMAD system of claim 1, wherein the PMAD controller is configured to detect a faulty SSPC of the matrix and to control the SSPCs of the matrix to bypass the faulty SSPC to supply power to the first and second loads.

8. A power management and distribution (PMAD) controller of a matrix-based PMAD system, comprising:
    a summing amplifier configured to receive as inputs first and second sensed current signals from first and second solid state power controllers (SSPCs) of an SSPD matrix between a plurality of power supplies and a plurality of loads;
    a reference voltage modification circuit configured to receive as an input a summed sensed current signal from the summing amplifier and to output to first and second power supplies among the plurality of power supplies first and second reference voltage modification signals to modify a voltage output from the first and second power supplies.

9. The PMAD controller of claim 8, wherein the reference voltage modification circuit comprises:
    a summed sensed current signal divider configured to divide the summed sensed current signal by a number of power sources of the matrix-based PMAD system determined to deliver power to generate an average current signal; and
    first and second summing circuits configured to generate first and second difference current signals by summing the average current signal with the first sensed current signal and the second sensed current signal, respectively.

10. The PMAD controller of claim 9, wherein the reference voltage modification circuit further comprises:
    third and fourth summing circuits configured to generate the reference voltage modification signals by summing the first and second voltage bias signals, respectively, with a reference voltage.

11. The PMAD controller of claim 10, further comprising:
    first and second proportional integral (PI) circuits to deliver voltage biased signals to the third and fourth summing circuits.

12. A method of controlling a matrix-based power management and distribution (PMAD) system, comprising:
    determining a number of loads among a plurality of loads to receive power;
    determining a level of power to be received by the loads determined to receive the power; and
    controlling a matrix of solid-state power controllers (SSPCs) connected between a plurality of power supplies and the plurality of loads to deliver the determined level of power to the loads determined to receive the power, wherein controlling the matrix of SSPCs comprises:
    receiving, by a PMAD controller, first and second current sensor signals from first and second SSPCs, the first and second SSPCs connected to at least one load among the plurality of loads;

controlling a power output from the plurality of power supplies to the matrix of SSPCs based on the first and second current sensor signals;

summing, by the PMAD controller, the first and second current sensor signals;

dividing a summed current sensor signal value by the number of power sources determined to deliver power to generate an average current signal;

generating first and second difference current signals based on combining the average current signal with the first and second sensed current signals, respectively;

generation first and second voltage bias signals based on the first and second difference current signals, respectively, and a reference voltage signal; and controlling the power output from the plurality of power supplies based on the first and second adjusted reference voltage signals.

13. The method of claim 12, wherein determining the number of loads to receive power includes determining a single load among the plurality of loads is to receive power, determining the level of power to be received by the single load includes determining that a power of at least two power supplies is to be received by the single load, and controlling the matrix of SSPCs comprises:

turning on a first SSPC among the matrix of SSPCs having a power input connected to a first power supply among the plurality of power supplies;

turning on a second SSPC among the matrix of SSPCs having a power input connected to a second power supply among the plurality of power supplies, each of the first and second SSPCs having a power output connected to the single load.

14. The method of claim 12, wherein determining the number of loads to receive power includes determining that at least two loads among the plurality of loads is to receive power, and controlling the matrix of SSPCs comprises:

turning on at least two SSPCs among the matrix of SSPCs, each of the at least two SSPCs having a power input connected to a different power supply and each of the at least two SSPCs having a power output connected to a different one of the at least two loads.

* * * * *